(12) United States Patent
Daniels (10) Patent No.: US 7,108,094 B2
(45) Date of Patent: Sep. 19, 2006

(54) MOBILE WATER DEVICE

(76) Inventor: Jerome Daniels, 11618 N. Hot Springs Dr., Parker, CO (US) 80138

( * ) Notice: Subject to any disclaimer, the term of this patent is extended or adjusted under 35 U.S.C. 154(b) by 0 days.

(21) Appl. No.: 10/773,884

(22) Filed: Feb. 6, 2004

(65) Prior Publication Data

US 2005/0173171 A1 Aug. 11, 2005

(51) Int. Cl.
*B60K 37/00* (2006.01)

(52) U.S. Cl. .................. 180/90; 222/146.6; 222/61; 296/37.12

(58) Field of Classification Search ............... 180/90; 222/610, 608, 146.6, 180, 189.11; 296/37.12, 296/37.8
See application file for complete search history.

(56) References Cited

U.S. PATENT DOCUMENTS

| | | | |
|---|---|---|---|
| 2,830,613 A * | 4/1958 | Mason ...................... 222/131 |
| 3,558,013 A * | 1/1971 | Ponzo et al. ............. 222/146.2 |
| 4,034,571 A | 7/1977 | Bollinger |
| 4,055,279 A * | 10/1977 | Lapera et al. ............ 222/146.2 |
| 4,140,150 A | 2/1979 | Rundell |
| 4,342,202 A | 8/1982 | Knutson |
| 4,384,512 A | 5/1983 | Keith |
| 5,060,479 A | 10/1991 | Carmi et al. |
| 5,099,649 A | 3/1992 | Zorn |
| 5,497,918 A | 3/1996 | Brilanchik |
| 5,701,754 A | 12/1997 | Choi et al. |
| 5,927,091 A | 7/1999 | Hong |
| 6,065,939 A | 5/2000 | Lin |
| 6,070,927 A * | 6/2000 | Mieglitz et al. ......... 296/37.12 |
| 6,076,706 A | 6/2000 | Kritchman |
| 6,092,381 A | 7/2000 | Hsiao et al. |
| 6,460,361 B1 | 10/2002 | Faria |
| 2002/0017102 A1 | 2/2002 | Bell |
| 2002/0023452 A1 | 2/2002 | Duerr et al. |

\* cited by examiner

*Primary Examiner*—Hau Phan
(74) *Attorney, Agent, or Firm*—Barber Legal; Craig W. Barber (57) ABSTRACT

A vehicle liquid dispensing system having a dispenser which may be retracted or concealed within the dashboard, a thermoelectric liquid heat exchanger for heating or cooling the liquids, an esthetically pleasing liquid reservoir and a pump: all components are disposed within the structure of the vehicle and do not take up passenger compartment space. In embodiments, an on/off switch may be provided to prevent dispensing, a switch may be provided at the dispenser to activate the pump, the pump may be electrical, and the fluid connections between the components of the system may be provided with connectors allowing easy cleaning.

15 Claims, 11 Drawing Sheets

MOBILE WATER DEVICE

FIELD OF THE INVENTION

This invention relates generally to vehicles and specifically to a water supply device invisibly built into the vehicle structure.

CROSS-REFERENCE TO RELATED APPLICATIONS

N/A

STATEMENT REGARDING FEDERALLY FUNDED RESEARCH

This invention was not made under contract with an agency of the US Government, nor by any agency of the US Government.

BACKGROUND OF THE INVENTION

It is a generally known problem that vehicles are not provided with liquid dispensers to provide hot or cold water to occupants of such vehicles.

Various attempts have been made to solve this problem.

US patent application Publication No. 20020023452 issued Feb. 28, 2002 to Duerr et al for COOLING CONTAINER FOR VEHICLES teaches an interesting under seat wine cellar.

US patent application Publication No. 20020017102 issued Feb. 14, 2002 to Bell for THERMOELECTRIC HEAT EXCHANGER is less irrelevant, as it teaches a heat exchanger arrangement between a liquid and a thermoelectric system. However, the liquid is then used as a coolant for items like seat cushions or (see FIG. 8) a conventional ice chest type cooler.

U.S. Pat. No. 6,460,361 issued Oct. 8, 2002 to Faria for VEHICLE BEVERAGE DISPENSER is an item that teaches a fountain on the dashboard of the vehicle. However, it uses air conditioning coolant, not thermoelectric means, and thus teaches away from devices using thermoelectric cooling and heating. Numerous patents make the choice to use engine liquids such as air conditioning coolant (R-134a, FREON, ethylene glycol) due to the great amounts of energy which an automobile engine can produce when compared to electrical systems.

U.S. Pat. No. 6,092,381 issued Jul. 25, 2000 to Hsiao et al for REFRIGERATOR FOR A MOTOR VEHICLE teaches an under seat ice-chest connected to vehicle refrigerants, presumably the air conditioning fluids.

U.S. Pat. No. 6,076,706 issued Jun. 20, 2000 to Kritchman for CHILLED DRINKING WATER SUPPLY FOR AUTOMOTIVE VEHICLES is one of the items which uses the automobile's Freon (presumably including R-134 instead) in a heat exchanger to cool a drink.

One item of prior art (U.S. Pat. No. 6,065,939 issued May 23, 2000 to Lin for DRINKING WATER SUPPLY FOR AUTOMOBILE PURPOSE) may have a dispenser on the dashboard of a vehicle, that item, the '939 patent, teaches the use of an electric heater and may teach the use of an electric cooler, but it is not clear on this point: the item teaches two different structures for heating and cooling, which is normally unnecessary with a thermoelectric heater. It also appears to be a passenger space retrofit (a box), and thus is not disposed in the structural spaces of the vehicle. It has a "water storage bottle" which appears to be a commercial two liter soda pop bottle or something similar.

U.S. Pat. No. 5,927,091 issued Jul. 27, 1999 to Hong for DUAL-PURPOSE REFRIGERATOR FOR USE ON AN AUTOMOBILE is another one which uses automobile coolant fluids and thus teaches away from the use of thermo-electrical cooling and heating of liquids.

U.S. Pat. No. 5,701,754 issued Dec. 30, 1997 to Choi et al for AUTOMOBILE REFRIGERATOR teaches an automobile having a door set into the dashboard, but uses the air conditioning coolant system of the car, and does not cool and dispense liquids.

U.S. Pat. No. 5,497,918 issued Mar. 12, 1996 to Brilanchik for SYSTEM FOR DISPENSING A THERMALLY MANIPULATED DRINK IN A LAND VEHICLE is yet another one using the cooling abilities of the car AC fluids. This individual also proposes using the car ENGINE BLOCK COOLANT (ethylene glycol, for example) to heat as well as cool.

U.S. Pat. No. 5,099,649 issued Mar. 31, 1992 to Zorn for APPARATUS FOR COOLING A GLOVE COMPARTMENT IN A MOTOR VEHICLE is the item located using thermoelectrics to cool the glove box. This one does not implicate dispensing liquids.

U.S. Pat. No. 5,060,479 issued Oct. 29, 1991 to Carmi et al for THERMOELECTRIC DEVICE FOR HEATING OR COOLING FOOD AND DRINK CONTAINERS teaches a handheld cooler having thermoelectrics and the ability to be plugged into a 12 VDC outlet. It is in no sense "built-in" or concealed within the structure of the car: it takes up space in the passenger compartment of the vehicle.

U.S. Pat. No. 4,384,512 issued May 24, 1983 to Keith for BEVERAGE HEATER AND COOLER is another type of retrofit (see the '939 patent above) which uses a console rather than the dashboard and does at least have thermo-electric heaters. It uses a recessed dispenser on its own body/console rather than one that can be hidden behind the dash.

U.S. Pat. No. 4,342,202 issued Aug. 3, 1982 to Knutson for BEVERAGE COOLING APPARATUS FOR CONNECTION TO AUTO AIR CONDITIONER obviously teaches a device for connection to the air conditioner, as does U.S. Pat. No. 4,140,150 issued Feb. 20, 1979 to Rundell for DRINKING WATER SUPPLY AND CONDITIONER FOR VEHICLES. This one is mounted "console" style but close to the dashboard. U.S. Pat. No. 4,034,571 issued Jul. 12, 1977 to Bollinger for DRINKING WATER SUPPLY SYSTEM is yet another using the air conditioner fluids.

Obviously, it is desirable to provide a liquid dispensing system which is built into the structure of the vehicle and thus takes up no passenger compartment space, yet which uses clean thermoelectric heating and cooling of the liquids.

It is further desirable to provide a liquid dispensing system which is esthetically pleasing.

SUMMARY OF THE INVENTION

General Summary

A vehicle liquid dispensing system having a dispenser which may be retracted or concealed within the dashboard, a thermoelectric liquid heat exchanger for heating or cooling the liquids, an esthetically pleasing liquid reservoir and a pump: all components are disposed within the structure of the vehicle and do not take up passenger compartment space. In embodiments, an on/off switch may be provided to prevent dispensing, a switch may be provided at the dispenser to activate the pump, the pump may be electrical, and the fluid connections between the components of the system may be provided with connectors allowing easy cleaning.

Summary in Reference to Claims

It is therefore a first aspect, advantage, embodiment and objective of the present invention to provide a liquid supply apparatus for occupants of a vehicle having a dashboard and a structure, the apparatus comprising: a liquid supply reservoir, the liquid supply reservoir being disposed in the structure of such vehicle; a thermoelectric liquid heat exchanger disposed in such structure of such vehicle, the thermoelectric liquid heat exchanger having an operative liquid connection from the liquid supply reservoir, the thermoelectric liquid heat exchanger having disposed in the structure of such vehicle an operative heat exchange connection with the liquid connection from the liquid supply reservoir, whereby liquid within such operative liquid connection may have its heat content altered by the thermoelectric liquid heat exchanger; a liquid dispenser having a first position on the exterior of such dashboard of such vehicle, the liquid dispenser having an operative liquid connection from the thermoelectric liquid heat exchanger; and a pump disposed in such structure of such vehicle and operatively connected to at least one of the liquid connections, whereby liquid may be urged to pass from the reservoir through the thermoelectric liquid heat exchanger to the liquid dispenser, wherein all liquid connections are disposed inside of such structure of such vehicle.

It is therefore another aspect, advantage, embodiment and objective of the present invention to provide a liquid supply apparatus for occupants of a vehicle having a dashboard and a structure, the apparatus comprising: a liquid supply reservoir, the liquid supply reservoir being disposed in the structure of such vehicle; a thermoelectric liquid heat exchanger disposed in such structure of such vehicle, the thermoelectric liquid heat exchanger having an operative liquid connection from the liquid supply reservoir, whereby liquid within such operative liquid connection may have its heat content altered by the thermoelectric liquid heat exchanger; a liquid dispenser having a first position on the exterior of such dashboard of such vehicle, the liquid dispenser having an operative liquid connection from the thermoelectric liquid heat exchanger; and a pump disposed in such structure of such vehicle and operatively connected to at least one of the liquid connections, whereby liquid may be urged to pass from the reservoir through the thermoelectric liquid heat exchanger to the liquid dispenser, wherein the liquid connections are disposed inside of such structure of such vehicle.

It is therefore another aspect, advantage, embodiment and objective of the present invention to provide a liquid supply apparatus wherein the liquid dispenser has a second position concealing the liquid dispenser within such vehicle dashboard.

It is therefore another aspect, advantage, embodiment and objective of the present invention to provide a liquid supply apparatus wherein the liquid dispenser retracts into the dashboard in the second position, and extends out of the dashboard in the first position.

It is therefore another aspect, advantage, embodiment and objective of the present invention to provide a liquid supply apparatus wherein the liquid dispenser folds between the first and second positions.

It is therefore another aspect, advantage, embodiment and objective of the present invention to provide a liquid supply apparatus wherein the liquid dispenser slides between the first and second positions.

It is therefore another aspect, advantage, embodiment and objective of the present invention to provide a liquid supply apparatus wherein the liquid dispenser further comprises a door, and further wherein when the door is in an open position, the liquid dispenser is in the first position, and when the door is in a closed position, the liquid dispenser is in the second position.

It is therefore yet another aspect, advantage, embodiment and objective of the present invention to provide a liquid supply apparatus wherein the reservoir has an esthetically pleasing exterior.

It is therefore yet another aspect, advantage, embodiment and objective of the present invention to provide a liquid supply apparatus wherein the reservoir has an exterior appearance similar to a home appliance.

It is therefore yet another aspect, advantage, embodiment and objective of the present invention to provide a liquid supply apparatus wherein the pump is an electrical pump having a directly wired operative electrical connection to the vehicle wiring system.

It is therefore yet another aspect, advantage, embodiment and objective of the present invention to provide a liquid supply apparatus wherein the pump is a mechanical pump powered by the mechanical energy of the engine.

It is therefore yet another aspect, advantage, embodiment and objective of the present invention to provide a liquid supply apparatus further comprising: a first switch having a first position in which it provides electrical energy to the pump and a second position in which it prevents flow of electrical energy, and a second switch in series with the first switch, the second switch having a default position in which it prevents flow of electrical energy, the second switch disposed upon the liquid dispenser and dimensioned and configured such that when the liquid dispenser is used by an occupant of such vehicle, the second switch is activated to provide electrical energy to the pump.

It is therefore yet another aspect, advantage, embodiment and objective of the present invention to provide a liquid supply apparatus wherein the first switch is the vehicle ignition switch.

It is therefore yet another aspect, advantage, embodiment and objective of the present invention to provide a liquid supply apparatus wherein the first switch is mounted on the driver's side door.

It is therefore yet another aspect, advantage, embodiment and objective of the present invention to provide a liquid supply apparatus wherein each of the operative liquid connections further comprises: a conduit having a hollow core and two ends, and each end further comprises a adapter having a first connected position and a second disconnected position.

It is therefore yet another aspect, advantage, embodiment and objective of the present invention to provide a liquid supply apparatus wherein the thermoelectric liquid heat exchanger has a directly wired operative electrical connection to the vehicle electrical system, whereby when the vehicle electrical system is on, the thermoelectric liquid heat exchanger receives electrical energy from the vehicle electrical system.

INDEX OF DIAGRAMS

Reservoir 1
Thermoelectric Liquid Heat Exchanger 2
Pump 3
Liquid Dispenser 4
Switch 5
Terminal Block 6
Ground Block 7
Liquid Conduit 8
Electrical Conduit 9
Thermoelectric Heat Exchanger 20
Heat Exchange Elements 21–29
Reservoir 30
Strap 32
Reservoir Outlet 34
Electrical Pump 40
Pump Outlet 42
Pump Inlet 44
Conduit Tubing 50
Conduit Insulation 52
Dashboard 60
Dispenser Door 62
Dispenser Door Handle 64
Dispenser Door 72
Switch 74
Liquid Dispenser 76
Cup Holder 78
Hinge 79
Dispenser Door 82
First Switch 84
Liquid Dispenser 86
Second Switch 87
Cup Holder 88
Electric Motor 90
Cam 92
First Switch 94
Dispenser 96
Second Switch 97
Cup Holder 98
Conduit 102
Nozzle Head 106
Nozzle 110
Conduit 112
Fastener 113
Nozzle Head 116

DETAILED DESCRIPTION

Figure 1:
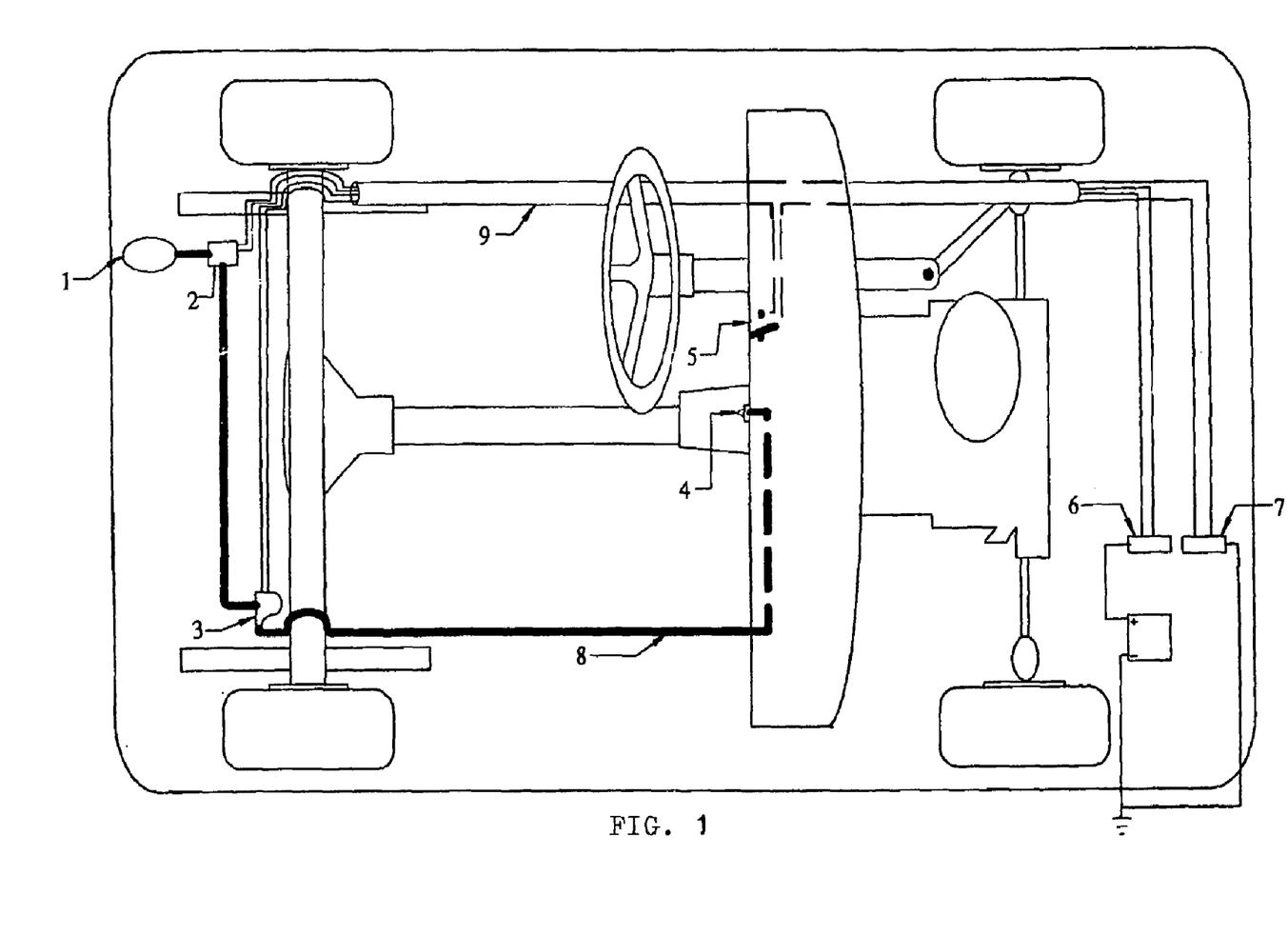
FIG. 1 is a schematic diagram showing an automobile equipped with the system of the present invention.

FIG. 1 is a schematic diagram showing an automobile equipped with the system of the present invention.

In the presently preferred embodiment and best mode presently contemplated for carrying out the invention, the device is "built into" the vehicle structure, regardless of whether it is a retrofit in kit form or original factory equipment. Whereas previous thermoelectric heaters and coolers have functioned as small portable refrigerators which may be placed in the passenger space of the vehicle, (on the transmission hump, atop the dashboard, in the glove box, or elsewhere in or on the dashboard, etc) the present invention features a thermoelectric heat to liquid exchanger (rather than an ordinary thermoelectric heat exchanger not designed for heat transfer to or from liquids) which takes up no space in the interior of the vehicle. Furthermore, all parts of the present invention, including the thermoelectric liquid heat exchanger, are disposed within the vehicle structure, with the exception of the liquid dispenser, which may retract into the dashboard or may temporarily extend therefrom for use.

By mounting the thermoelectric liquid heat exchanger outside of the passenger compartment, a number of advantages are gained. Firstly, as air circulation through the passenger compartment is normally maintained at a relatively low pace for human comfort, external mounting (inside of an air conduit or air duct, in the engine compartment, the luggage compartment, and so on) allows the provision of much greater air flow. Secondly, fan noise and heat exchanger noise are eliminated inside of the compartment. Thirdly, a much more powerful thermoelectric liquid heat exchanger may be provided. This is important as previous systems were limited to the size of a thermoelectric liquid heat exchanger (cooler/heater) which could practically be introduced into the passenger spaces without taking up too much volume, altering internal climate control to an excessive degree, generating noise, etc. Previous systems which required greater power needed to rely upon the power of engine fluids such as air conditioner fluids or engine coolant in order to achieve greater heat exchange capacity. Use of such devices argues away from equipping the vehicle with a larger and more powerful heat exchanger as in the present invention.

Reservoir 1 contains the liquid to be dispensed. Note that for practical and legal reasons, it is anticipated that the liquid to be dispensed will normally be water. Practical reasons for this include the fact that most natural beverages (orange juice, milk, etc) go bad or sour after being left unrefrigerated for any length of time, and in the presently preferred embodiment the thermoelectric liquid heat exchanger is turned off when the car is off. While alternative embodiments feature a thermoelectric liquid heater which remains on during periods of non-operation, the reason remains. Carbonated beverages tend to lose the carbonation due to outgassing, especially when vibrated. Intoxicating beverages are strictly illegal in all or nearly all jurisdictions. Beverages with sugars tend to produce an unhygienic condition in the liquid connections/conduits. Thus, while any liquid may be dispensed with the device of the present invention, water is the anticipated liquid of choice. Thermoelectric liquid heat exchanger 2 may be used to heat or cool the liquid, as many thermoelectric heat exchangers are "reversible" and use of such a reversible thermoelectric heat element is the preferred embodiment. Thermoelectric liquid heat exchanger receives electrical energy from the car electrical system via a directly wiring connection, not by means of being plugged into the vehicle's 12VDC or 42VDC jack in the passenger. This is another aspect of not allowing the system to impinge on passenger spaces not present in prior art thermoelectric vehicular systems.

Pump 3 is in the preferred embodiment a clean electrical pump, however, in alternative embodiments pump 3 may be a mechanical unit (such as that used to drive engine coolants, which operate off of an engine shaft cam).

Liquid dispenser 4 is similar to a soda fountain in appearance when it is deployed for use: a nozzle is extended over a cup holder or switch, toggle or the like. In alternative embodiments, small drain, with a grill or similar arrangement, may be provided, which may lead via an additional operative liquid conduit/connection to a grey water holding tank or may simply exit the vehicle to the road beneath.

Switch 5 is in the preferred embodiment mounted close to the dispenser, and acts to energize pump 3, which then urges liquid from the reservoir, through the various portions of the operative liquid conduit path and through the thermoelectric liquid heat exchanger, the pump itself, and to exit the liquid dispenser.

Terminal block 6 (the positive side of the invention's electrical system) and ground block 7 may be standard to the automobile other than having provision for extra electrical conduit 9, which provides electricity/energizes the invention. Note that in the best mode now contemplated, the thermoelectric liquid heat exchanger 2 (also referred to as a thermoelectric liquid heat exchange unit, as it is optimized for heat transfer to/from the thermoelectric element to a liquid) is energized whenever the vehicle (car, truck, motorcycle, bus, RV, SUV, trolley, etc) is turned on, while pump 3 is only activated by switch 5. In other embodiments, two switches are used to activate pump 3, one switch being mounted on the liquid dispenser in "soda fountain" style, that is, pushing a cup holder with a cup actually activates pump 3 and the flow of liquid from dispenser 4.

Liquid conduits 8 are advantageously small diameter insulated tubes. In certain parts of the automobile structure, durability and ease of cleaning is at a premium, while in other locations, flexibility is necessary or beneficial. Thus, a broad range of materials may be desirable: metals, papers, plastics, polymer, rubbers, composites, etc. Insulation may be provided in any of a number of forms as well, including the same list.

Figure 2:
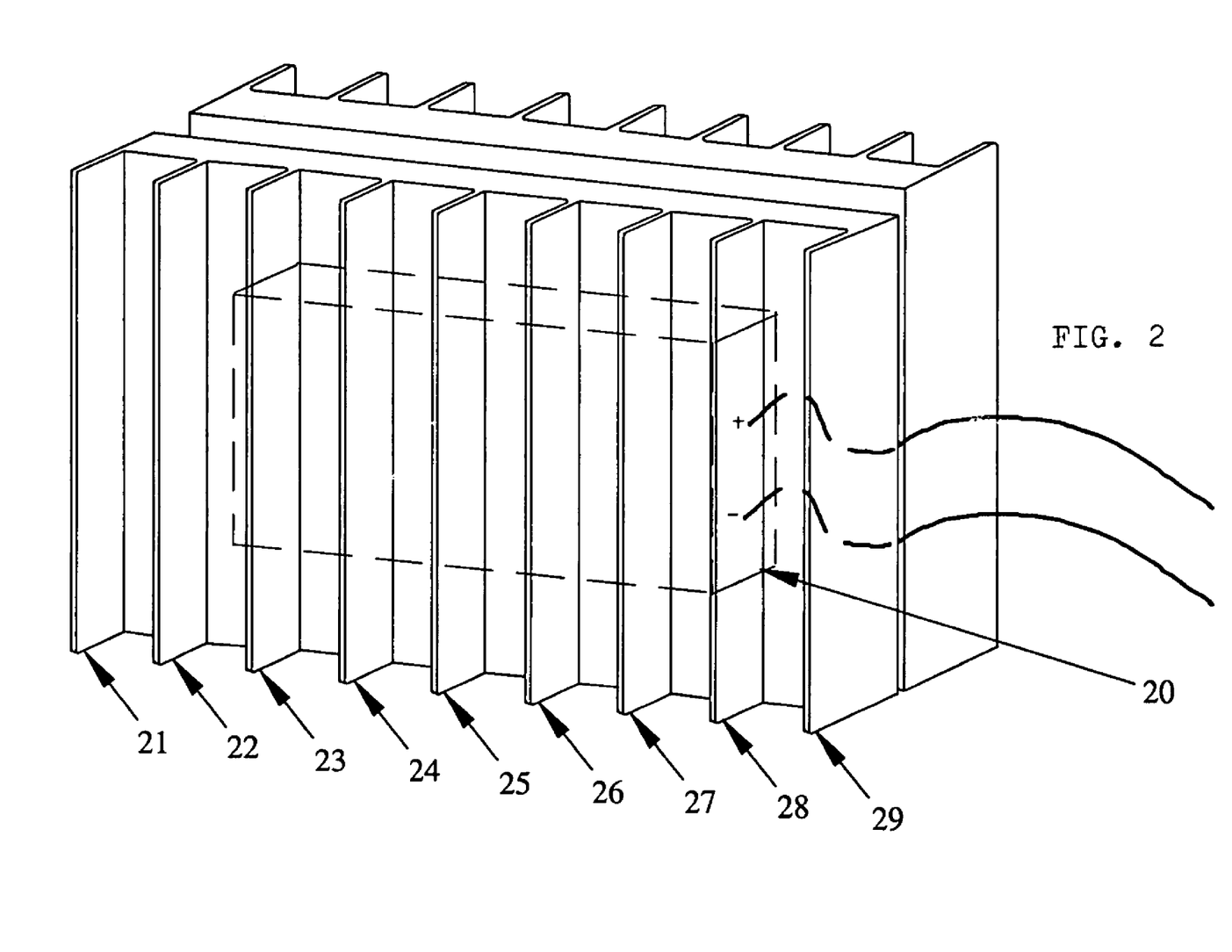
FIG. 2 is a perspective view of a first alternative embodiment of a thermoelectric liquid heat exchanger according to the present invention.

FIG. 2 is a perspective view of a first alternative embodiment of a thermoelectric liquid heat exchanger according to the present invention. Thermoelectric liquid heat exchanger 20 has numerous heat exchange elements 21–29, in certain embodiments fins but in other embodiments conduits, blocks or other devices. Liquid conduits pass through or across at least one heat exchange element and thus gain or reject heat according to the mode of operation of thermoelectric liquid heat exchanger 20. The heat to liquid exchanger shown is only exemplary: instead of fins across or through which the liquid conduits pass, there may be tubes (in effect, part of the liquid connection system) through which it passes, flat plates and so on. The use of such thermoelectric liquid heat elements is greatly facilitated by their location/disposition in the structure of the automobile: elements located in the passenger compartment must necessarily be smaller and of a more esthetically pleasing appearance. A broad range of more efficient and more powerful thermoelectric liquid heaters (which are of course also thermoelectric liquid coolers) devices may be provided by means of the invention, without the unpleasant, complex and potentially unsanitary use of engine coolant fluids.

Figure 3:
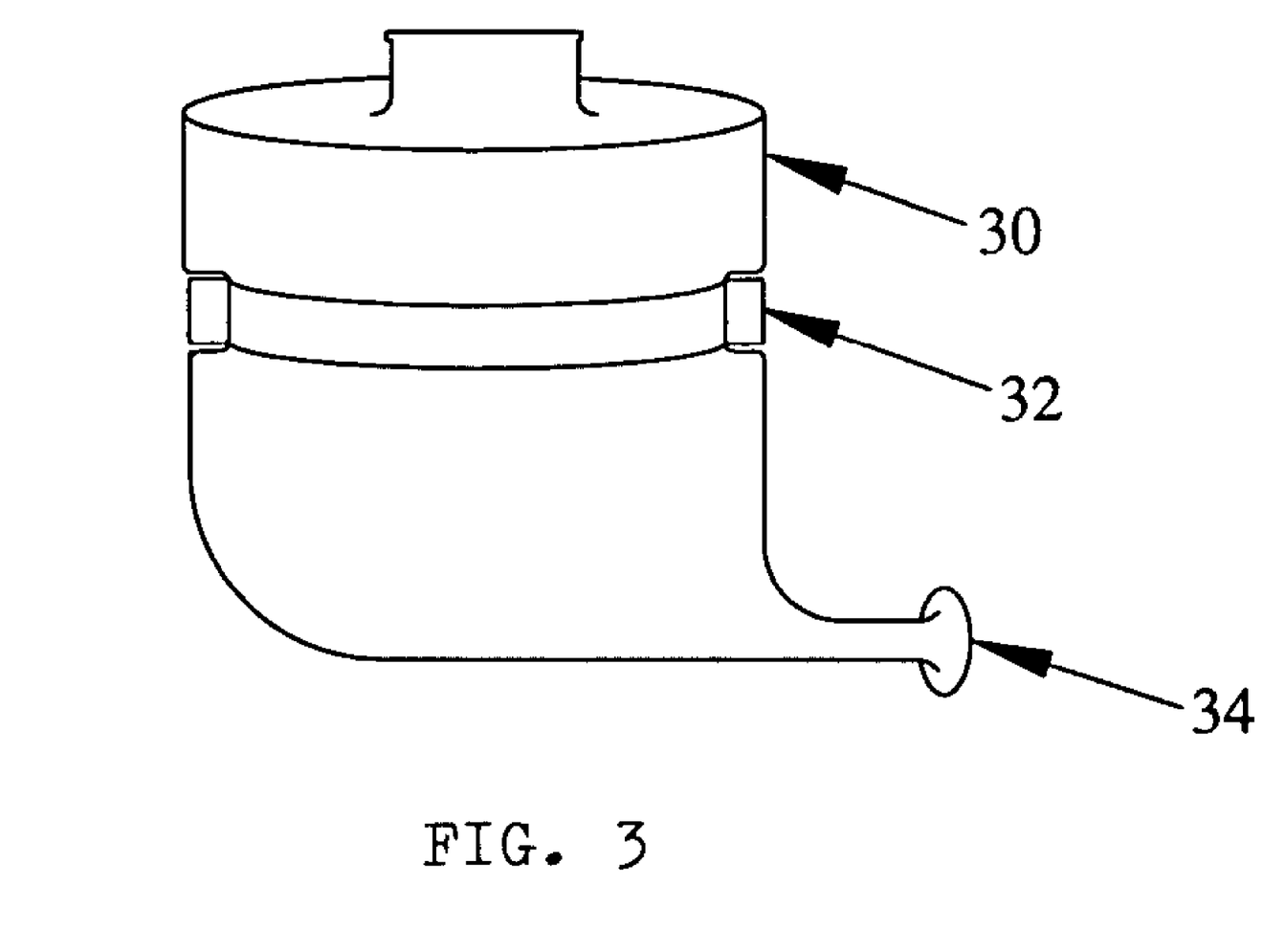
FIG. 3 is a perspective view of a reservoir according to a second alternative embodiment of the present invention.

FIG. 3 is a perspective view of a reservoir according to a second alternative embodiment of the present invention. Reservoir 30 in this embodiment is a fairly standard polymer vehicle tank such as might be used for windshield wiper fluid or the like. However, in other alternative embodiments, reservoir 30 may be made esthetically pleasing to the eye of anticipated users. It may have covers, be color coordinated and so on.

In one embodiment, the reservoir may be located in the vehicle luggage compartment, but in other embodiments, it may have a small inlet which is coordinated with the vehicle interior and may be accessible therefrom. For example, it may be located at the retracting dispenser of the invention, it may be located behind a seat, behind a panel, and other such locations which are built into the vehicle structure but may be accessible from trunk, passenger compartment, engine compartment, etc. In yet another embodiment, the reservoir may have an exterior which as the appearance of a kitchen appliance, that is, having features such as a chrome or enamel surface, may have a kitchen counter top appearance, and so on. The appearance of the reservoir and dispenser may be adjusted and optimized to suit the target demographic user.

Strap 32 may hold the reservoir attached to the vehicle structure, though equivalent devices may be employed. Reservoir outlet 34 may lead directly to pump 3 or to operative liquid connections 8.

Figure 4:
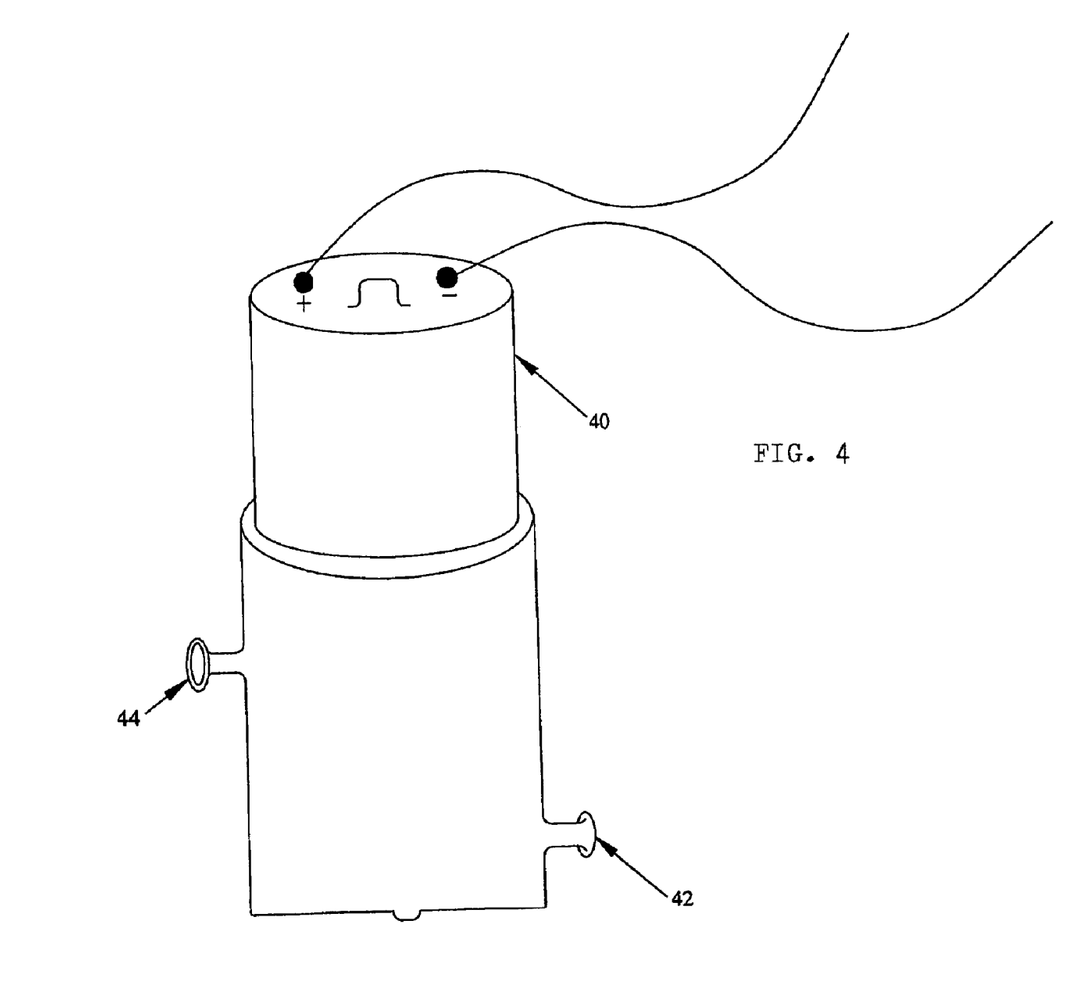
FIG. 4 is a perspective view of a pump according to a third alternative embodiment of the invention.

FIG. 4 is a perspective view of a pump according to a third alternative embodiment of the invention. Electrical pump 40 has pump outlet 42 and pump inlet 44. Electrical pump 3 is presently favored for reasons of tidiness and because it may be located almost anywhere in the vehicle structure, whereas a mechanical pump must be located in the engine compartment.

Figure 5:
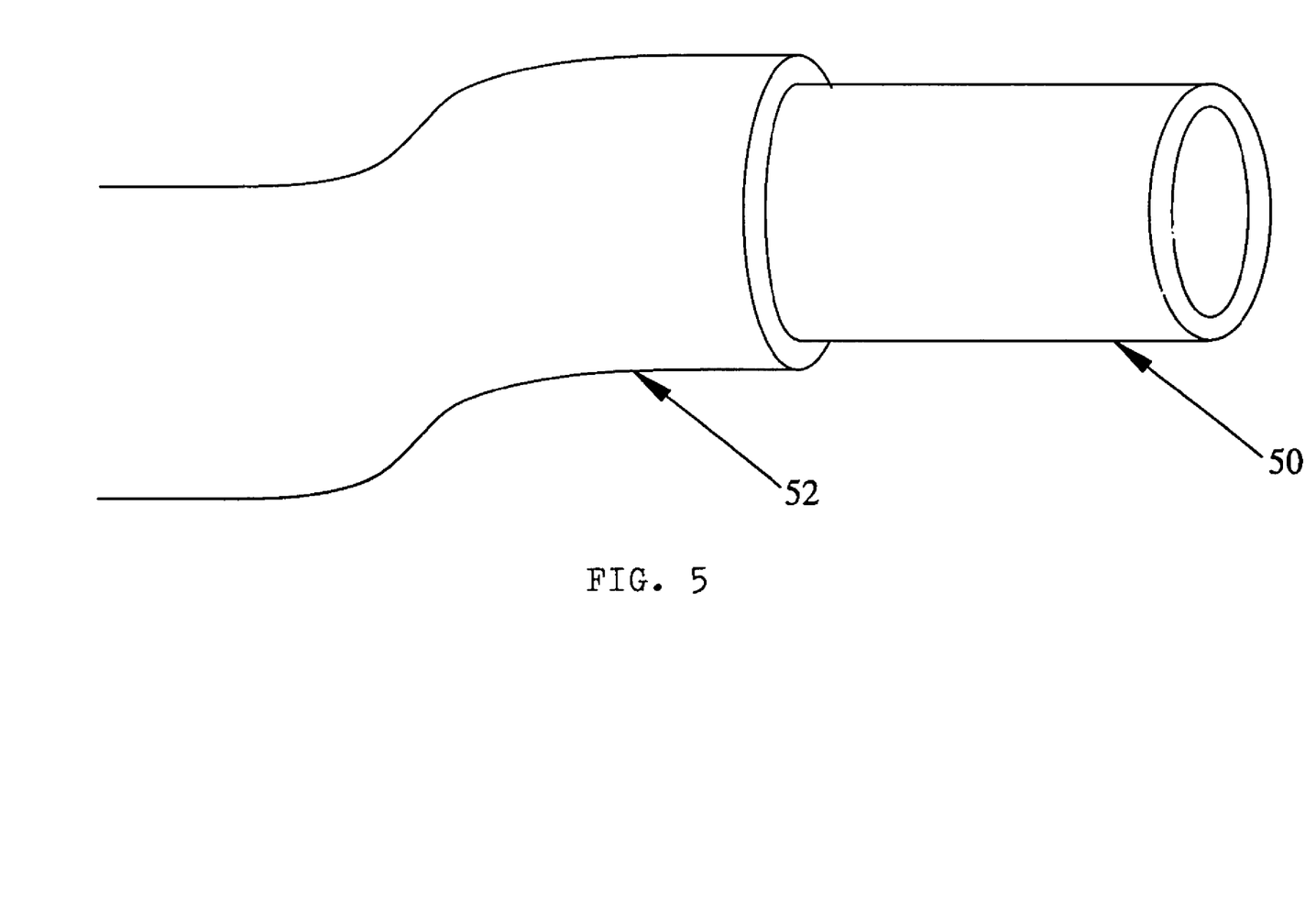
FIG. 5 is a perspective view of an operative liquid connection according to a fourth embodiment of the invention, with the insulation partially removed.

FIG. 5 is a cross sectional view of an operative liquid connection according to a fourth embodiment of the invention. Conduit tubing 50 may be in the preferred embodiment ½ inch (approx 12.7 mm) diameter polymer tubing, but it may be other diameters and materials such as ¼ inch metal and so on. Conduit insulation 52 may be used on the exterior of conduit tubing 50 to decrease unwanted heat exchange and thus keep liquids cool (or hot, if appropriate) while they are in the conduit.

While any conduit having a hollow core and two ends, will work, in the preferred embodiment, each end further comprises an adapter having a first connected position and a second disconnected position. This allows easy disconnection of the conduit/connection from a given part of the system (dispenser, nozzle, etc) and thus easy cleaning of the system as needed. Such pipes, tubes, conduits, lines, culverts and so on all fall within the definition of conduit and/or connection as used herein.

The materials of the conduit should be "food grade" under all applicable regulations, for example, stainless steel is commonly used for liquid conduits through which beverages will flow. Certain plastics, polymers, etc may also be suitable under this standard.

Figure 6:
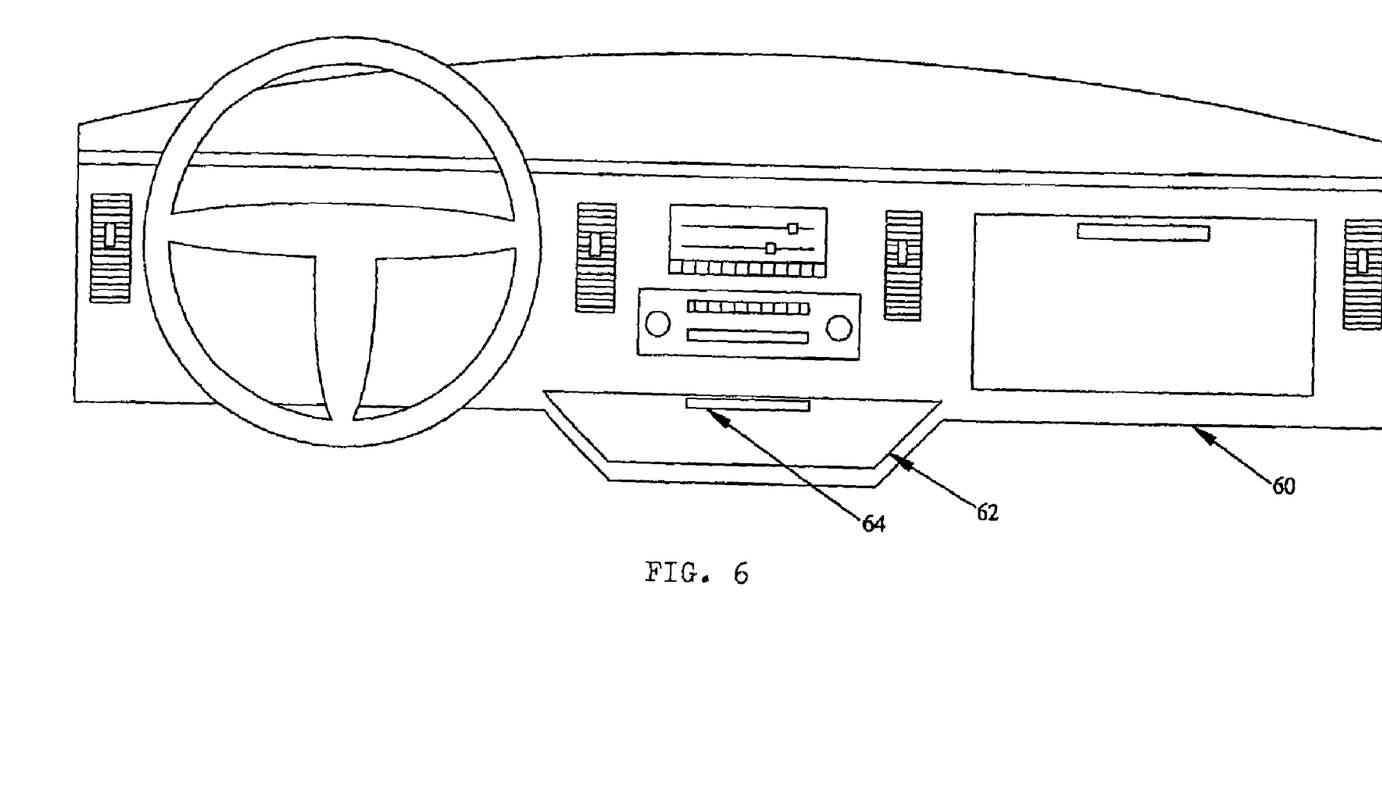
FIG. 6 is a front view of a dashboard of a vehicle equipped with a fifth alternative embodiment of the invention, in the closed position.

FIG. 6 is a front view of a dashboard of a vehicle equipped with a fifth alternative embodiment of the invention, in the closed position. Dashboard 60 has dispenser door 62 in turn having dispenser door handle 64. When closed, this has much the appearance of a vehicle automobile lighter and ashtray combination.

Figure 7:
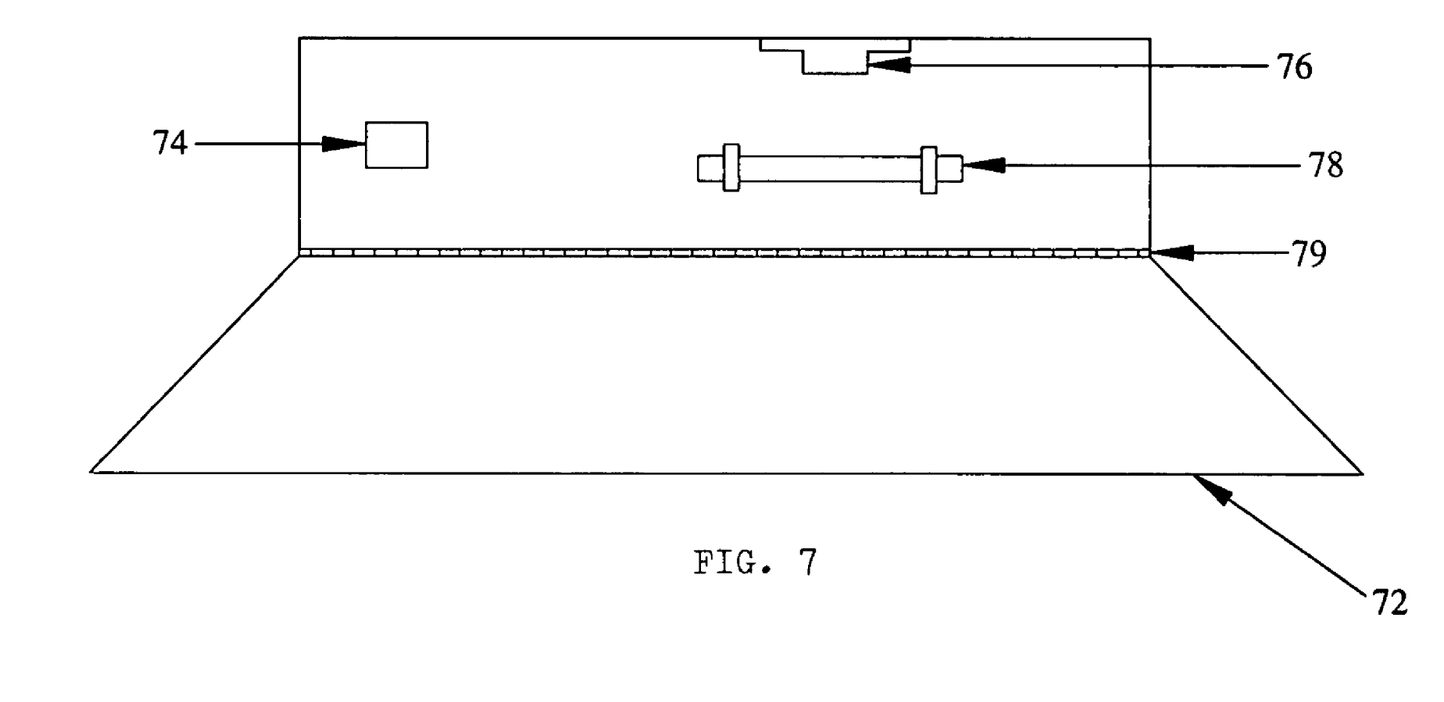
FIG. 7 is a front view of the liquid dispenser apparatus of a sixth embodiment of the invention in the open position.

FIG. 7 is a front view of the liquid dispenser apparatus of a sixth embodiment of the invention in the open position. Dispenser door 72 has been lowered to expose switch 74, liquid dispenser 76, cup holder 78, and hinges 79. Opening door 72 may merely expose the liquid dispenser apparatus underneath. However, in other embodiments, liquid dispenser apparatus in general may retract, fold, slide, or move due to the motion of door 72 or otherwise move between a position in which it is open for dispensing and a position in which it is concealed within the vehicle structure, dashboard, upholstery, seats, etc.

Switch 74 (which may be a single pole or if needed multiple pole switch) may activate pump 3, liquid dispenser 76 may be a simple or compound nozzle, and cup holder 78 may be a spring loaded and expandible cup holder.

Figure 8:
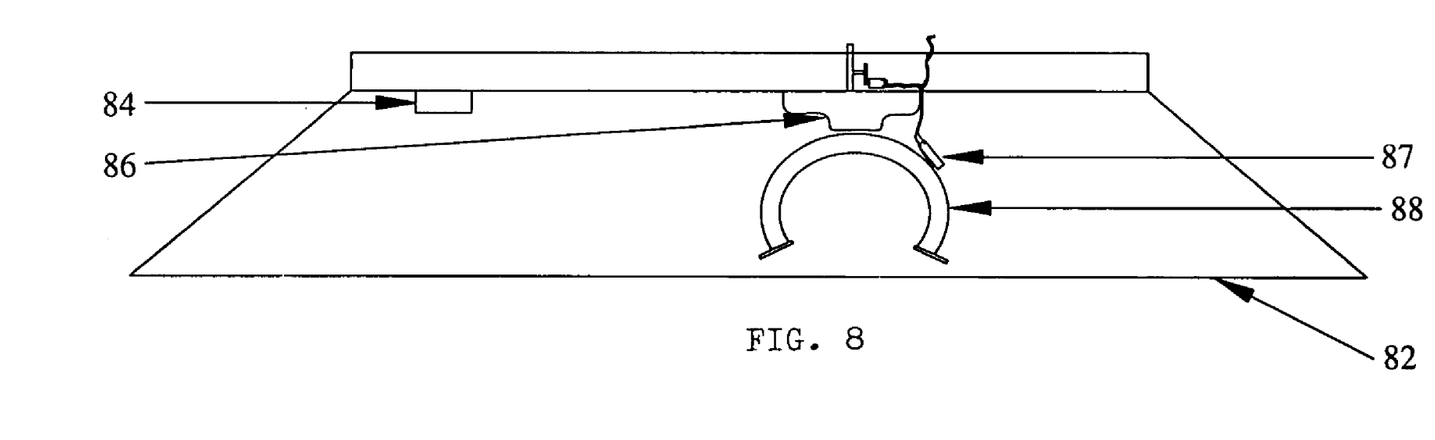
FIG. 8 is a top view of the liquid dispenser apparatus of a seventh embodiment of the invention in the open position.
Figure 9:
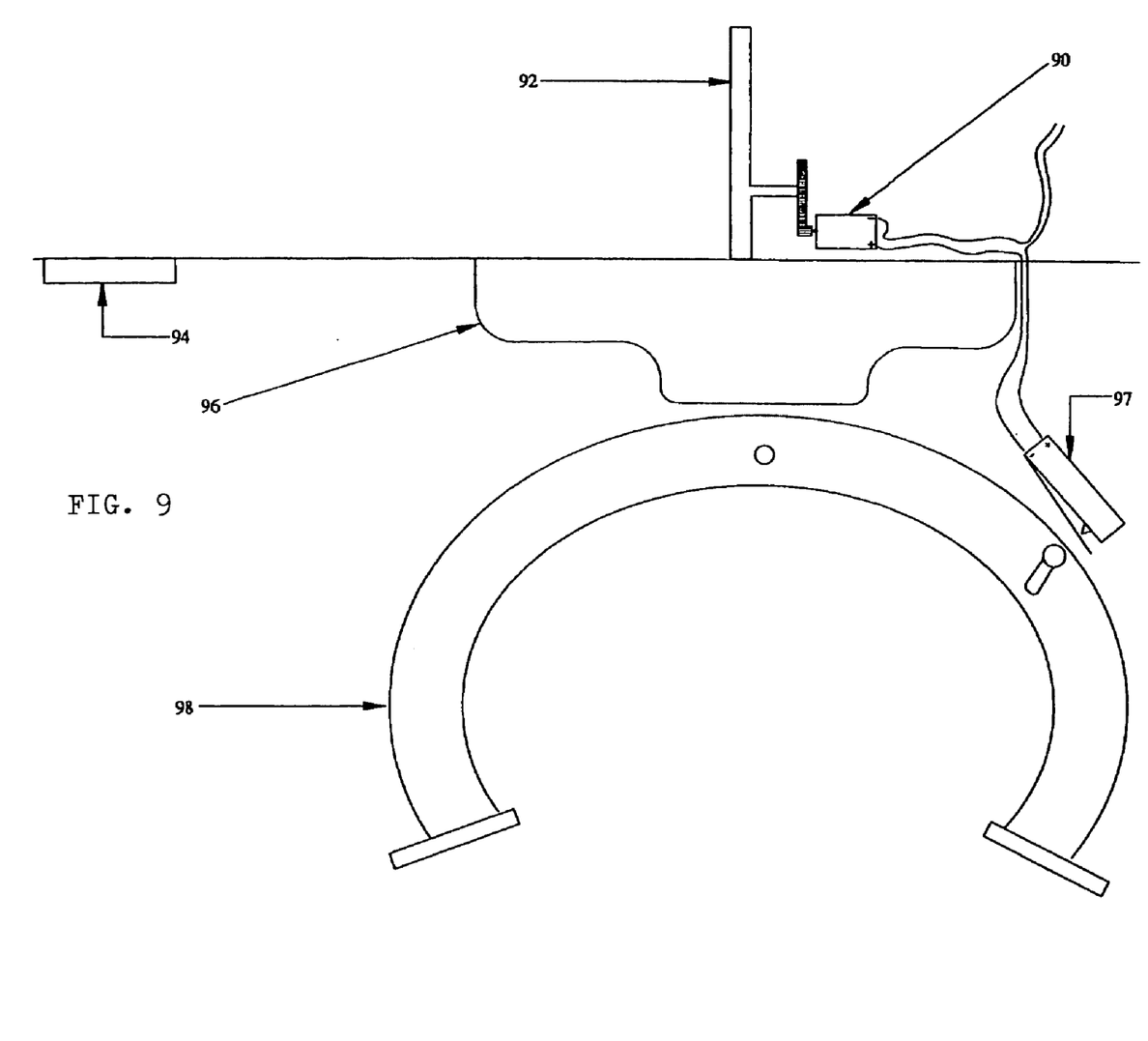
FIG. 9 is a top view of the liquid dispenser apparatus of the seventh embodiment, enlarged to show details of the opening/closing apparatus of the dispenser.

FIG. 8 is a top view of the liquid dispenser apparatus of a seventh embodiment of the invention in the open position. Dispenser door 82, first switch 84, liquid dispenser 86 and cup holder 88 all operate much as discussed for the previous embodiment. Second switch 87 however may be soda fountain type switch operated by a lever or push plate against which the cup or mug is pushed, or as shown, it may be activated by the expansion of the cup holder to hold a cup. FIG. 9 is a top view of the liquid dispenser apparatus of the seventh embodiment, enlarged to show details of the opening/closing apparatus of the dispenser. Electric motor 90 operates via a differential gear set cam 92, in particular, it moves cam 92 from the position shown (with the smaller side of cam 92 towards the dispenser) to a second position in which the larger side of cam 92 is towards dispenser 96, thus forcing dispenser 96 forwards. Second switch 97 is actually operated by cup holder 98, which is expansible and/or pivots about a point near the dispenser 96. The motion of the arm of cup holder 98 (for example, along a pin and slot near to second switch 97) may push against switch 97 and thus actuate in certain embodiments the pump, so as to supply liquid, or in other embodiments, may actuate the electric motor, so as to open or extend the liquid dispenser, or in yet other embodiments, it may do both.

Figure 10:
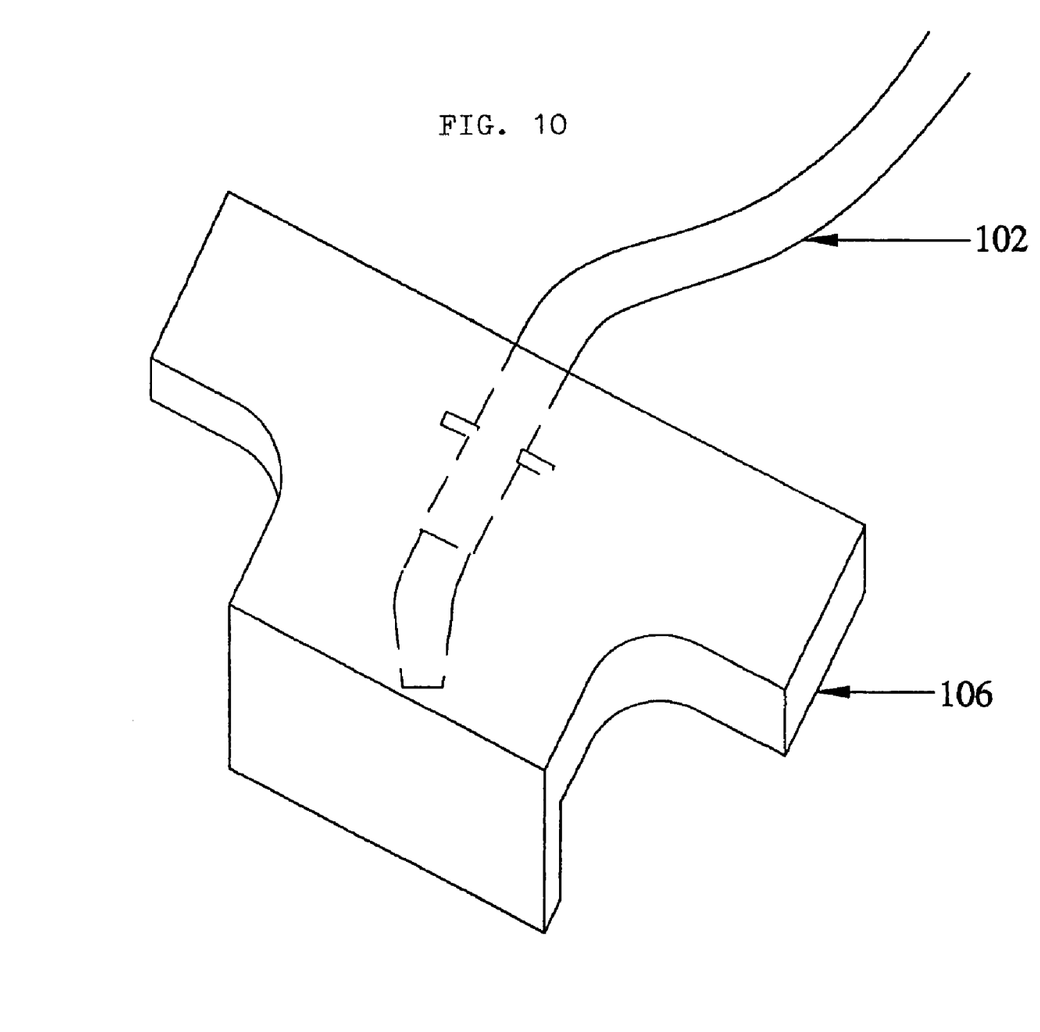
FIG. 10 is a perspective and partially transparent view of the nozzle portion of the liquid dispenser.
Figure 11:
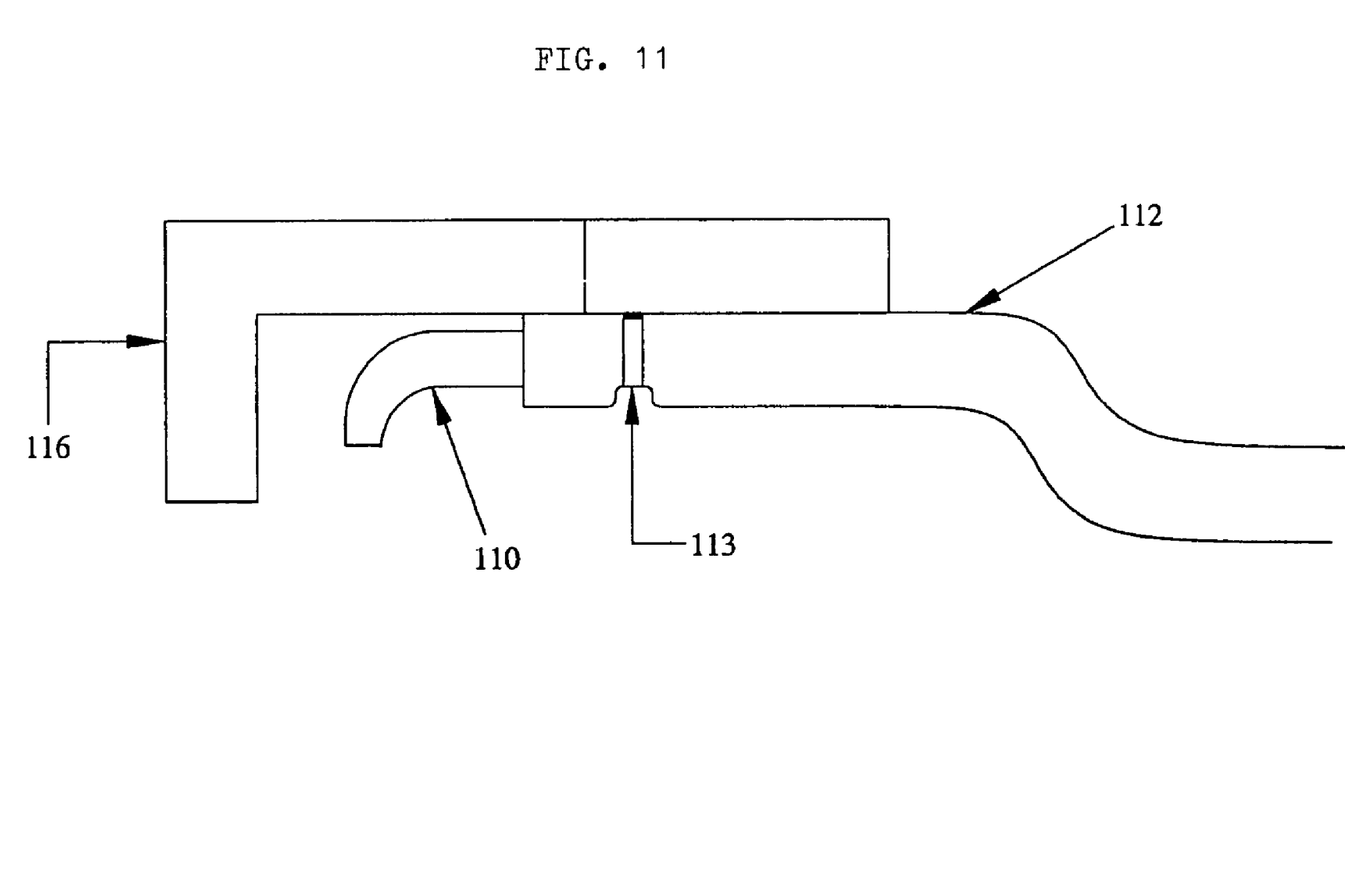
FIG. 11 is a side view of the liquid dispenser, showing details of construction.

FIG. 10 is a perspective and partially transparent view of the nozzle portion of the liquid dispenser, while FIG. 11 is a side view of another liquid dispenser. Conduit 102 enters nozzle head 106 and thus supplies liquid on demand by the user. In more detail in the embodiment of FIG. 11, nozzle 110 projects from conduit 112: either or both may be secured by fastener 113 to nozzle head 1 16. It will be appreciated that in this section of the conduit/connection running from the reservoir to the nozzle, it is advantageous to have a flexible conduit/connection, so that it may bend and flex when the dispenser is extended and retracted.

Control circuitry in alternative embodiments may operate the pump for a set period of time or volume of liquid, so as to provide a given quantity of fluid without continuous operation of the switches.

In other embodiments, one or both switches may be integrated into the vehicle ignition switch, thus allowing the system pump to be deactivated when the vehicle is not on. One switch may be mounted on the driver's side door so as to allow parental control of the unit.

It will be appreciated that prior art liquid cooling/heating systems relying upon engine fluids such as air conditioner fluids (such as R-134a) or engine coolants (such as ethylene glycol and water) did not require a direct wiring of the system to an electrical source, while prior art thermoelectric systems for liquid dispensing normally plug into the vehicle 12VDC outlet. Prior art vehicle liquid systems do not allow or suggest use of thermoelectric heat exchange, while prior art thermoelectric liquid dispensing systems are not integrated into the vehicle but rather use the passenger spaces, at much reduced efficiency and esthetic appeal.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A vehicle having a liquid supply, a dashboard and a structure, the said liquid supply comprising:
   a liquid supply reservoir, the liquid supply reservoir being disposed in the structure of the vehicle;
   a thermoelectric heat exchanger having a heat exchanger element, which is wound around a liquid connection to heat or cool the liquid connection, said liquid connection is connected between the liquid supply reservoir and a liquid dispenser, disposed in the structure of the vehicle;
   the liquid dispenser having a first position on the exterior of the dashboard of the vehicle; and
   a pump disposed in the structure of the vehicle and operatively connected to the liquid connection, whereby liquid may be urged to pass from the reservoir through the thermoelectric heat exchanger to the liquid dispenser, wherein
   the liquid connection is disposed inside of the structure of the vehicle.

2. The vehicle liquid supply apparatus of claim 1, wherein the liquid dispenser has a second position concealing the liquid dispenser within the vehicle dashboard.

3. The vehicle liquid supply apparatus of claim 2, wherein the liquid dispenser retracts into the dashboard in the second position, and extends out of the dashboard in the first position.

4. The vehicle liquid supply apparatus of claim 2, wherein the liquid dispenser folds between the first and second positions.

5. The vehicle liquid supply apparatus of claim 2, wherein the liquid dispenser slides between the first and second positions.

6. The vehicle liquid supply apparatus of claim 2, wherein the liquid dispenser further comprises a door, and further wherein when the door is in an open position, the liquid dispenser is in the first position, and when the door is in a closed position, the liquid dispenser is in the second position.

7. The vehicle liquid supply apparatus of claim 1, wherein the reservoir has an esthetically pleasing exterior.

8. The vehicle liquid supply apparatus of claim 1, wherein the reservoir has an exterior appearance similar to a home appliance.

9. The vehicle liquid supply apparatus of claim 1, wherein the pump is an electrical pump having a directly wired operative electrical connection to the vehicle electrical system.

10. The vehicle liquid supply apparatus of claim 9, further comprising:
    a first switch having a first position in which it provides electrical energy to the pump and a second position in which it prevents flow of electrical energy, and a second switch in series with the first switch, the second switch having a default position in which it prevents flow of electrical energy, the second switch disposed upon the liquid dispenser and dimensioned and configured such that when the liquid dispenser is used by an occupant of such vehicle, the second switch is activated to provide electrical energy to the pump.

11. The vehicle liquid supply apparatus of claim 1, wherein the pump is a mechanical pump powered by the mechanical energy of the engine.

12. The vehicle liquid supply apparatus of claim 1, wherein the first switch is the vehicle ignition switch.

13. The vehicle liquid supply apparatus of claim 1, wherein the first switch is mounted on the driver's side door.

14. The vehicle liquid supply apparatus of claim 1, wherein the operative liquid connection further comprise:

a conduit having a hollow core and two ends, and each end further comprises an adapter having a first connected position and a second disconnected position.

15. The vehicle liquid supply apparatus of claim 1, wherein the thermoelectric heat exchanger has a directly wired operative electrical connection to the vehicle electrical system, whereby when the vehicle electrical system is on, the thermoelectric heat exchanger receives electrical energy from the vehicle electrical system.

* * * * *